United States Patent
Kusy et al.

(10) Patent No.: US 6,679,695 B2
(45) Date of Patent: Jan. 20, 2004

(54) PULTRUSION APPARATUS FOR CONTINUOUS FABRICATION OF FIBER-REINFORCED PLASTIC ARTICLES HAVING A NON-LINEAR SHAPE, METHODS OF FABRICATING SUCH ARTICLES AND COMPOSITIONS USED THEREIN

(75) Inventors: Robert P. Kusy, Chapel Hill, NC (US); Scott Zufall, Kalamazoo, MI (US); Matthew Camp, Chapel Hill, NC (US); Glenys Thorstenson, Chapel Hill, NC (US); Brian Rucker, Chapel Hill, NC (US); Hiawatha Demby, Chapel Hill, NC (US); David Ruddell, Chapel Hill, NC (US); Elodia Cole, Morrisville, NC (US); Aditya Patel, Washington, NC (US)

(73) Assignee: University of North Carolina at Chapel Hill, Chapel Hill, NC (US)

( * ) Notice: Subject to any disclaimer, the term of this patent is extended or adjusted under 35 U.S.C. 154(b) by 170 days.

(21) Appl. No.: 09/867,048

(22) Filed: May 29, 2001

(65) Prior Publication Data

US 2002/0180112 A1 Dec. 5, 2002

(51) Int. Cl.⁷ .................... B29C 55/00; B29C 35/00; B29C 61/08; H06B 6/00; A61C 3/00; A61C 7/00; C08F 2/46
(52) U.S. Cl. .................. 425/106; 425/112; 425/501; 264/479; 264/480
(58) Field of Search .................. 264/479, 480; 425/112, 501, 106; 433/2–24, 34, 229; 428/377

(56) References Cited

U.S. PATENT DOCUMENTS 4,411,625 A   10/1983  Koblitz et al. ............ 433/217
4,434,121 A *  2/1984  Schaper .................... 264/136
4,462,946 A   7/1984  Goldsworthy ............. 264/23

(List continued on next page.)

FOREIGN PATENT DOCUMENTS

GB        2214087 A    8/1989   ............ A61C/8/00

OTHER PUBLICATIONS

C. Chen & C. Ma, "Pultruded Fiber Reinforced Blocked Polyurethane (PU) Composites. I. Processability and Mechanical Properties," *Journal of Applied Polymer Science*, 46: 937–947 (1992).

T. Chen & R. P. Kusy, "Effect of Methacrylic Acid: Methyl Methacrylate Monomer Ratios on Polymerization Rates and Properties of Polymethyl Methacrylates," *J. Biomed. Mater. Res.*, 36: 190–199 (1997).

(List continued on next page.)

Primary Examiner—Susan W. Berman
(74) Attorney, Agent, or Firm—Myers Bigel Sibley & Sajovec

(57) ABSTRACT

A pultrusion apparatus for manufacturing a fiber-reinforced plastic article having a non-linear shape includes a mold configured to receive a partially cured fiber-reinforced plastic article and to form the partially cured fiber-reinforced plastic article into a spirally wound shape. A drive mechanism is coupled to the mold and configured to rotate the mold such that the fiber-reinforced plastic article is taken up on the mold. An energy source is operatively associated with the mold and positioned so that the partially cured fiber-reinforced plastic article is cured in a spirally wound shape as the article is taken up on the longitudinally extending mold. The pultrusion apparatus allows for continuously shaping a non-linear fiber-reinforced plastic article, obviating the need for any of the work to be done by hand, which may be labor intensive, not as highly reproducible, and potentially contaminating.

37 Claims, 5 Drawing Sheets

U.S. PATENT DOCUMENTS

| | | | | |
|---|---|---|---|---|
| 4,544,359 | A | | 10/1985 | Waknine .................... 523/115 |
| 4,717,341 | A | | 1/1988 | Goldberg et al. .............. 433/9 |
| 4,894,012 | A | | 1/1990 | Goldberg et al. ........... 433/215 |
| 5,040,964 | A | | 8/1991 | Oppawsky et al. ......... 425/135 |
| 5,135,685 | A | | 8/1992 | Masuhara et al. ............ 264/22 |
| 5,439,215 | A | * | 8/1995 | Ratchford ................... 473/561 |
| 5,540,870 | A | * | 7/1996 | Quigley ...................... 264/103 |
| 5,547,379 | A | | 8/1996 | Hasel ...................... 433/212.1 |
| 5,869,178 | A | | 2/1999 | Kusy et al. ................ 428/335 |

OTHER PUBLICATIONS

Robert G. Craig, "Chemistry, Composition, and Properties of Composite Resins," *Dental Clinics of North America*, 25:2 219–239 (Apr., 1981).

Karmaker et al., "Continuous Fiber Reinforced Composite Materials as Alternatives for Metal Alloys Used for Dental Appliances," *J. Biomaterials Applications*, 11: 318–328 (Jan., 1997).

K. C. Kennedy & R. P. Kusy, "UV–Cured Pultrusion Processing of Glass–Reinforced Polymer Composites," *Journal of Vinyl & Additive Technology*, 1:3 182–186 (Sep., 1995).

K. C. Kennedy & R. P. Kusy, "Investigation of Dual–Staged Polymerization and Secondary Forming of Photopultruded, Fiber–Reinforced, Methacrylate–Copolymer Composites," *J. Biomed. Mater. Res.*, 41: 549–559 (1998).

Robert P. Kusy, "Guest Editorial: Dental Materials: A Glance Back . . . but a Hard Look into the Future," *J. Dental Res.*, 68: 1374 (1989).

Robert P. Kusy, "The Future Orthodontic Materials: The Long–Term View," *Am. J. Orthod. Dentofacial Orthop.*, 113: 91–95 (Jan., 1998).

Robert P. Kusy, "A Review of Contemporary Archwires: Their Properties and Characteristics," *Angle Orthod.*, 67:3 197–208 (1997).

R. P. Kusy & J. Q. Whitley, "Influence of Archwire and Bracket Dimensions on Sliding Mechanics: Derivations and Determinations of the Critical Contact Angles for Binding," *European J. Orthodontics*, 21: 199–208 (199).

R. P. McKamey & R. P. Kusy, "Stress–Relaxing Composite Ligature Wires: Formulations and Characteristics," *Angle Orthod.*, 69:5 441–449 (1999).

S. W. Zufall & R. P. Kusy, "Sliding Mechanics of Coated Composite Wires and the Development of an Engineering Model for Binding," *Angle Orthod.*, 70:1 34–47 (2000).

S. W. Zufall & R. P. Kusy, "Stress Relaxation and Recovery Behaviour of Composite Orthodontic Archwires in Bending," *European J. Orthodontics*, 22: 1–12 (2000).

* cited by examiner

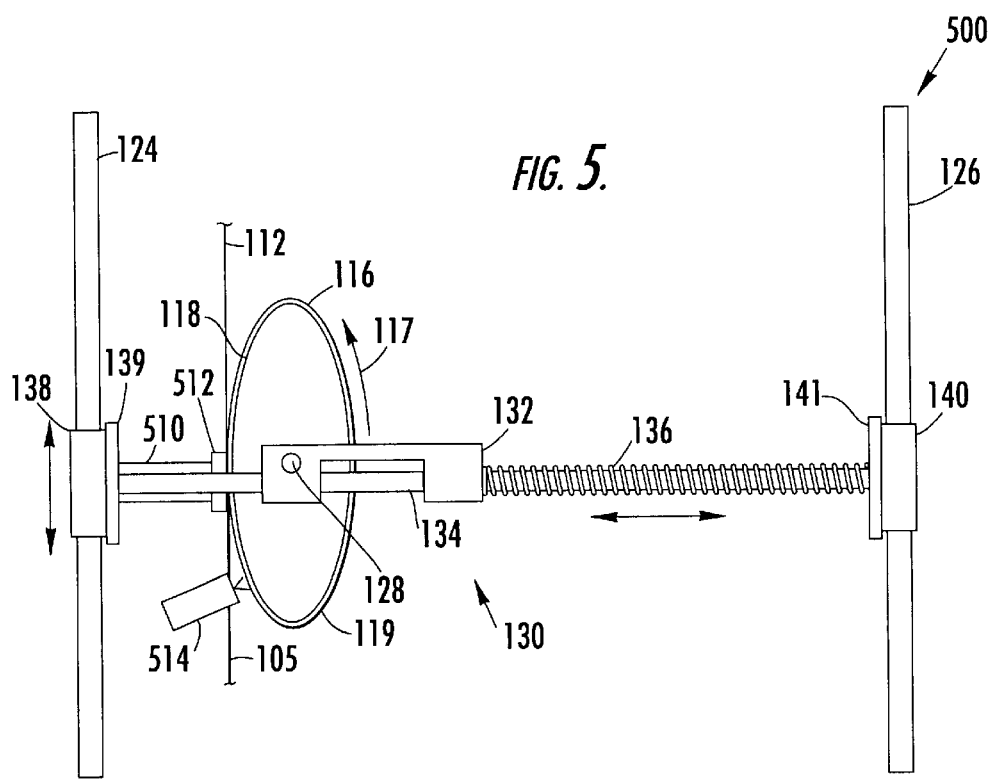
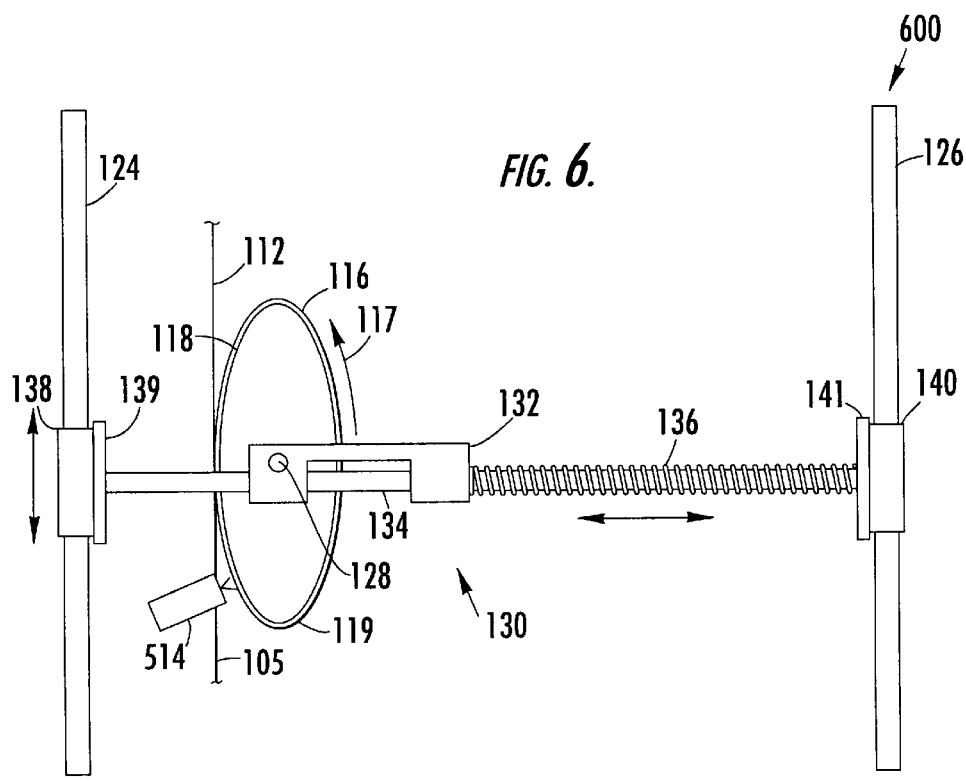

PULTRUSION APPARATUS FOR CONTINUOUS FABRICATION OF FIBER-REINFORCED PLASTIC ARTICLES HAVING A NON-LINEAR SHAPE, METHODS OF FABRICATING SUCH ARTICLES AND COMPOSITIONS USED THEREIN

FIELD OF THE INVENTION

The present invention generally relates to apparatus and methods of fabricating plastic articles, and particularly relates to apparatus and methods of forming pultruded plastic articles.

BACKGROUND OF THE INVENTION

Pultrusion is a well-established process for the production of composite material with continuous fiber reinforcement. Such fiber-reinforced materials have been used as dental devices, such as orthodontic archwires. For example, U.S. Pat. No. 5,869,178 to Kusy et al. discloses a pultrusion apparatus configured to form fiber-reinforced polymeric plastic materials having a linear shape.

In K. C. Kennedy and R. P. Kusy, *Investigation of Dual-staged Polymerization and Secondary Forming of Photopultruded, Fiber-reinforced, Methacrylate-Copolymer Composites* 41 J. BIOMED. MATER. RES. at 549 (1998), the authors propose pultruding fibers through a resin comprising benzoin ethyl ether (BEE), 2,2-Bis[4-(2-hydroxy-3-methacyloxypropoxy)phenyl]propane (Bis-GMA), triethylene glycol dimethacrylate (TEGDMA), and methyl metha/crylate (MMA) and curing the pultruded fibers to form a partially cured, β-staged composite. Secondary forming of the β-staged composites is accomplished by swaging circular cross-sections into rectangular ones, using a multi-chambered compression mold, while maintaining a constant cross-sectional area. Thermal polymerization of the β-staged composites is conducted within the mold for reformed materials.

U.S. Pat. No. 4,894,012 to Goldberg et al. discusses forming dental appliances directly on a dental cast from preformed bars, strips, or wires using a heat gun. Alternatively, the preformed shape is initially fabricated using a mold that is heated at optimum temperature under pressure in an oven or by a heat gun applying drying heat. The preformed shape may allow arch forms and other complex shapes that more closely approximate the final dental appliance. While the final dental appliance can be made using a male-female mold, the preformed shape used for the final dental appliance may also be formed with a heat gun on the dental cast. The final forming process for a dental appliance may be accomplished using a dental cast, which accurately duplicates both the hard and soft tissues in the mouth. The fiber-reinforced composite strip or bar is sealed or clipped to the cast, and the sections are sequentially heated until soft. Following the softening of the preformed component, the preformed component is molded to the intricate detail of the teeth or soft tissues by hand. The final dental appliance is cooled to room temperature before its removal from the cast.

U.S. Pat. No. 4,462,946 to Goldsworthy proposes an apparatus that receives strands of filament reinforcing material impregnated with a hardenable binder such as a curable resin. The resin-impregnated fiber containing reinforcing strands are disposed about plugs formed from a bulk-molding compound, each of which are draped over a continuous string to form a chain of the plugs on the string. A shrinkable film is wrapped about and encloses each of the strand-encased plugs on the chain. The film is shrunk and a pre-curing device initiates a cure of the curable resin binder impregnated in the strands. The fiber-wrapped, strand-encased composite plugs are introduced into a final mold that contains a pair of split mold elements, which imparts the final shape to each of the articles to be produced. The final mold also applies a curing radiation to the film-wrapped, strand-encased plugs to cure finally the plugs to hardened reinforced plastic composite articles. The shrinkable film is removed, and the final articles are cut into the discrete composite articles.

Various polymeric resins have been described for pultrusion applications. For example, in A. C. Karmaker and A. T. DiBenedetto, *Continuous Fiber Reinforced Composite Materials as Alternatives for Metal Alloys Used for Dental Appliances,* 11 J. BIOMAT. APPL., at 318 (January 1997), the authors propose fabricating prepregs by pulling glass rovings through a resin bath containing a 50/50 mixture of Bis-GMA and polyethylene glycol dimethacrylate (PEGDMA 200), to which 0.75 weight percent benzoyl peroxide (BPO) was added as an initiator. The prepregs were mounted on a flat plate and transferred to an oven for β-staging.

In T. Chen and R. P. Kusy, *Effect of Methacrylic Acid-:Methyl Methacrylate Monomer Ratios on Polymerization Rates and Properties of Polymethyl Methacrylates,* 36 J. BIOMED. MAT. RES. at 190 (1997), the authors propose five binary formulations that were prepared from methyl methacrylate (MMA) and methacrylic acid (MAA) monomers, and six ternary formulations that were prepared from polysols of polymethyl methacrylate, MMA and MAA. Benzoin ethyl ether (BEE) was used as an ultraviolet initiator.

In Ross P. McKamey and Robert P. Kusy, *Stress-relaxing Composite Ligature Wires: Formulations and Characteristics,* 69:5 THE ANGLE ORTHODONTIST, at 441 (1999), the authors propose encasing ultra-high molecular weight poly(ethylene) fibers in a poly(n-butyl methacrylate) polymer, formulated from a polysol and an optimal benzoin ethyl ether concentration.

SUMMARY OF THE INVENTION

According to one aspect of embodiments of the present invention, a pultrusion apparatus for manufacturing a fiber-reinforced plastic article having a non-linear shape includes a mold configured to receive a partially cured fiber-reinforced plastic article and to form the partially cured fiber-reinforced plastic article into a spirally wound shape. A drive mechanism is coupled to the mold and configured to rotate the mold such that the fiber-reinforced plastic article is taken up on the mold. An energy source is operatively associated with the mold and positioned so that the partially cured fiber-reinforced plastic article is cured in a spirally wound shape as the article is taken up on the longitudinally extending mold.

In embodiments of the present invention, the mold includes a core having a longitudinally extending outer surface, and a longitudinally extending sleeve substantially surrounding a portion of the outer surface of the core. Alternatively, the core and the sleeve may be integrally formed. The longitudinally extending sleeve is configured to provide a first die portion, and may comprise a material, such as a fluoropolymer, which will provide a non-adherent surface. A second die portion is positioned to abut the sleeve such that the first die portion and the second die portion define a die configured to receive the partially cured fiber-reinforced plastic article. In some embodiments, the energy source is positioned downstream from the die, while in other embodiments the energy source is operatively associated with the second die portion. The energy source may be an electromagnetic radiation source and the second die portion may comprise a material that is substantially transparent to electromagnetic radiation emitted by the electromagnetic radiation source.

In other embodiments of the present invention, an alpha-staging apparatus through which one or more fibers are drawn is used to form the partially cured fiber-reinforced plastic article. In still other embodiments of the present invention, the pultrusion apparatus includes a carriage system operatively associated with the mold for maintaining the die and a forming die on the alpha-staging apparatus in substantially vertical alignment with one another. The mold may move longitudinally, laterally, and/or vertically within the carriage system such that the die and the forming die are substantially vertically aligned with one another as the fiber-reinforced plastic article is taken up along a longitudinal portion of the mold.

According to a second aspect of embodiments of the present invention, a pultrusion apparatus for manufacturing a fiber-reinforced plastic article includes a die having a first die portion and a second die portion, and an energy source coupled to the die. At least the second die portion is substantially transparent to energy provided by the energy source so that the fiber-reinforced plastic article is cured by passing energy through the die. The energy source may be an electromagnetic radiation source, which emits electromagnetic radiation in the visible spectrum or the ultraviolet spectrum. The second die portion may comprise a material that is substantially transparent to electromagnetic radiation emitted by the electromagnetic radiation source. The first die portion may also be substantially transparent to energy provided by the energy source or, alternatively, the first die portion may be substantially opaque to energy provided by the energy source.

According to a third aspect of embodiments of the present invention, a method of forming a fiber-reinforced plastic article includes the steps of continuously pultruding a fiber-reinforced plastic article to form a fiber-reinforced plastic article having a first partially cured state, continuously shaping the first fiber-reinforced plastic article having the first partially cured state into a spirally wound shape, and continuously curing the fiber-reinforced plastic article having the first partially cured state to form a spirally wound fiber-reinforced plastic article having a second cured state that is more rigid than the fiber-reinforced plastic article having the first partially cured state. In embodiments of the present invention, the shaping step includes the step of molding the fiber-reinforced plastic article on a rotatable mold. The shaping step may further include the step of drawing the fiber-reinforced plastic article having the first partially cured state through a die having a cross-section to form a fiber-reinforced plastic article having the first partially cured state and substantially having the cross-section. A portion of the rotatable mold may define a portion of the die. The drawing step and the molding step may occur contemporaneously. In other embodiments, the shaping step includes the step of drawing the fiber-reinforced plastic article having the first partially cured state through a die having a cross-section to form a fiber-reinforced plastic article having the first partially cured state and substantially having the cross-section. The curing step and the drawing step may occur simultaneously.

In still other embodiments of the present invention, the curing step includes inputting energy into the fiber-reinforced plastic article and the ratio of the energy input per unit length of the fiber-reinforced plastic article is substantially constant. The energy may be electromagnetic radiation as well as thermal energy. The pultruding step may include the steps of shaping an uncured fiber-reinforced plastic article, and curing the uncured fiber-reinforced plastic article to form the fiber-reinforced plastic article having a first partially cured state. The step of curing the uncured fiber-reinforced article may include inputting a first type of energy into the fiber-reinforced article, and the step of curing the fiber-reinforced plastic article having a first partially cured state may include inputting a second type of energy into the fiber-reinforced plastic article. The first and the second types of energy are preferably different, and are more preferably different types of electromagnetic radiation, for example, ultraviolet radiation and electromagnetic radiation in the visible spectrum.

In a fourth aspect of embodiments of the present invention, a composition of matter includes from about 55 to about 85 percent by weight of a binder, from about 15 to about 45 percent by weight of a diluent monomer, from about 0.05 to about 1 percent by weight of an ultraviolet photoinitiator, from about 0.05 to about 0.5 percent by weight of a visible photoinitiator, and from about 0.05 to about 0.5 percent by weight of an accelerator.

Embodiments of the present invention provide the ability to form a fiber-reinforced composite to a desired shape as part of a continuous manufacturing process. The present invention allows for continuously shaping a spirally wound fiber-reinforced plastic article, obviating the need for any of the work to be done by hand, which may be labor intensive, not as highly reproducible, and potentially contaminating.

BRIEF DESCRIPTION OF THE DRAWINGS

FIG. 5 is an end view of an embodiment of a pultrusion apparatus according to the present invention having an energy source separate from the die portion;

FIG. 6 is an end view of an embodiment of a pultrusion apparatus according to the present invention having an energy source and no die portion.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Elements in the various figures are not drawn to scale and may be enlarged to show detail.

Figure 1:
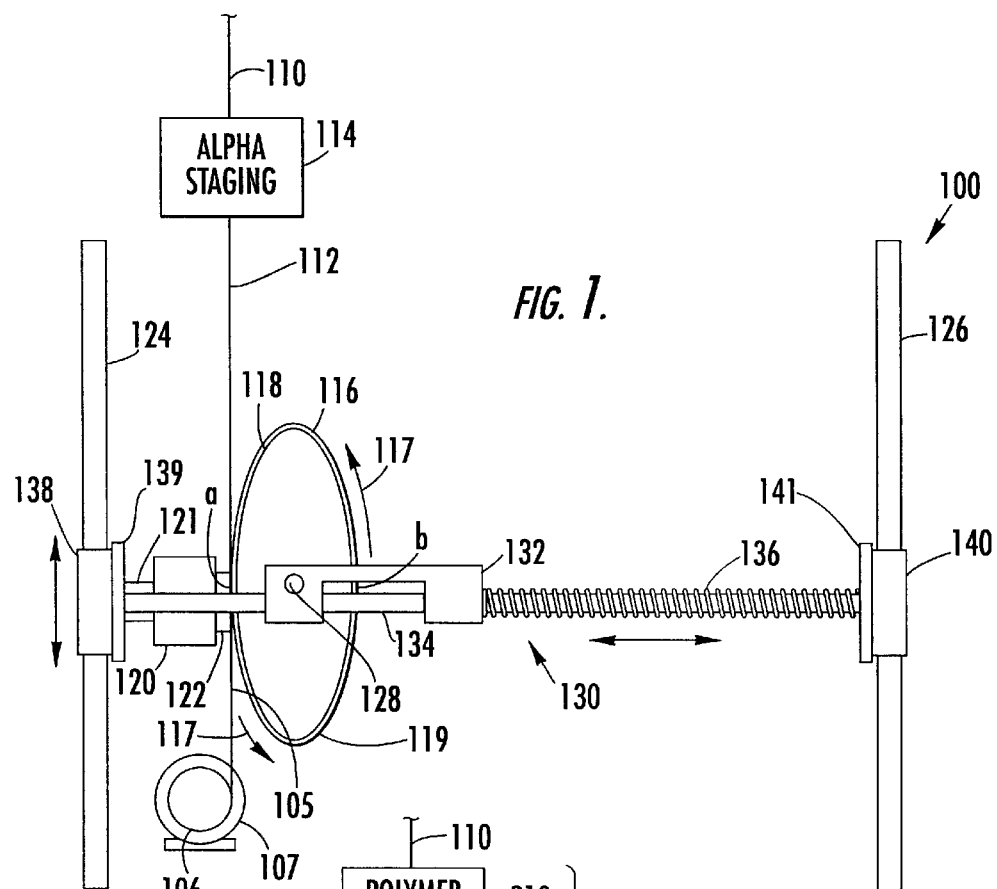
FIG. 1 is an end view of an embodiment of a pultrusion apparatus according to the present invention having a die portion operatively associated with an energy source.

Referring now to FIG. 1, an embodiment of a pultrusion apparatus 100 according to the present invention will now be described. The pultrusion apparatus 100 has a first support column member 124 coupled to a first cross bar member 139 by a first coupling member 138, and a second support column member 126 coupled to a second cross bar member 141 by a second coupling member 140. The first and the second cross bar members 139 and 141, respectively, are coupled to a carriage system 130. The carriage system 130 includes a lateral slide rod 134. A slide member 132 and a spring 136 are operatively associated with the lateral slide rod 134 such that the slide member 132 slides on the lateral slide rod 134 and is biased toward the first cross bar member 139 by an opposing force provided by the spring 136.

Still referring to FIG. 1, a mold 116 is operatively associated with the slide member 132 via a longitudinal slide rod 128. The mold 116 has a core 118 and an outer sleeve 119. The core 118 preferably comprises a material selected from the group consisting of wood, plastic, metal, ceramic, and/or composite, and in the presented embodiments is comprised of a wood inner core and a body filler (Dynatron/Bondo Co., Atlanta, Ga.) outer core. The outer sleeve 119 preferentially substantially surrounds the outer surfaces of the core 118. The sleeve preferably comprises a material that provides a non-adherent surface; more preferably the sleeve comprises a fluoropolymer. A particularly preferred sleeve material is one of the partially or fully fluorinated materials marketed as Teflon® or Teflon® PFA (DuPont Corp., Wilmington, Del.). While the core 118 and the sleeve 119 as shown in FIG. 1 are separately formed, it is to be understood that cores and sleeves of the present invention may be integrally formed, preferably from the group consisting of wood, plastic, metal, ceramic, and/or composite.

A drive cable 105 and drive wheel 106 are operatively associated with the mold 116 such that the drive cable 105 and the drive wheel 106 form a drive mechanism that acts to cause the mold 116 to rotate about the axis defined by the longitudinal slide rod 128 as shown in FIG. 1 by arrows 117. The mold 116 is rotated by taking up the drive cable 105 on the drive wheel 106 which is driven by a drive motor 107 operatively associated with the drive wheel 106. As will be understood by those skilled in the art, various drive mechanisms may be employed.

As illustrated in FIG. 1, the mold 116 has an elliptical cross-section having a semi-major axis and a semi-minor axis. The semi-major axis is preferably between about 0.1 and about 10 meters, more preferably between about 10 and about 100 centimeters, and most preferably between about 100 and about 200 millimeters. The semi-minor axis is preferably between about 0.1 and about 10 meters, more preferably between about 10 and about 100 centimeters, and most preferably between about 100 and about 200 millimeters. The length of the semi-major and semi-minor axes may be critical when the pultrusion apparatus is used to form orthodontic appliances such as preformed archwires because the archwires, which have a parabolic shape formed by cutting the elliptically shaped spirally wound fiber-reinforced plastic article into two, should be sized properly to fit the set of teeth on which they will be used. While the mold 116 as shown in FIG. 1 has an elliptical lateral cross-section, it is to be understood that molds of the present invention may have various other lateral cross-sections including, but not limited to, oblong, circular, and rectangular. It is preferred to use molds having elliptical or similar cross-sections for the fabrication of orthodontic archwires.

As shown in FIG. 1, the mold 116 is operatively associated with an alpha-staging apparatus 114. In operation, a strand of fiber material 110, which may include one or more individual fibers, enters the alpha-staging apparatus 114. The alpha-staging apparatus 114 is described further herein with reference to FIG. 2. A partially cured fiber-reinforced plastic article 112 exits the alpha-staging apparatus 114. The partially cured fiber-reinforced plastic article 112 is then taken up on the mold 116. The mold 116 shapes the partially cured fiber-reinforced plastic article 112 in two ways. First, the mold 116 continuously shapes the partially cured fiber-reinforced plastic article 112 longitudinally from a straight article into an article having a spirally wound shape. As used herein, the term "spirally wound shape" is used to describe the shape of a fiber-reinforced plastic article that is taken up on any of the various molds of the present invention and should not be limited to the shape formed when a fiber-reinforced plastic article is taken up on a cylindrical mold. To form an orthodontic appliance such as a preformed archwire, this spirally wound shape can be cut at points a and b to form a plurality of parabolic arches. Second, the mold 116 continuously shapes the cross-section of the partially cured fiber-reinforced plastic article 112 such that it has, for example, a substantially rectangular cross-section, as described herein with reference to FIG. 4. As used herein, the term "rectangular cross-section" includes square cross-sections. The mold 116 continuously shapes the cross-section of the partially cured fiber-reinforced plastic article 112 using a die defined by the surface of the mold 116, which acts as a first die portion, and a second die portion 122, which is operatively associated with the mold 116.

Still referring to FIG. 1, an energy source 120 is coupled to the first cross bar member 139 by a support member 121. The energy source 120 may be any one or more of various energy sources, including thermal sources, infra-red sources, visible sources, ultraviolet sources, x-rays, gamma rays, beta particles, high energy electrons, and combinations thereof. The energy source 120 is preferably an electromagnetic radiation source, which may emit various forms of electromagnetic radiation. The electromagnetic radiation source preferably emits electromagnetic radiation that is in the visible (i.e., about 400 to about 700 nm) or ultraviolet (i.e., about 100 to about 475 nm) spectra. A particularly preferred electromagnetic radiation source is a Midwest Insight II with a blue filtered light bulb for the visible light source (Midwest Co., Des Plaines, Ill.) or a Lesco Super Spot MKII 100 watt short-arc DC mercury vapor lamp for the UV light source (Lesco Inc., Torrence, Calif.). The energy source 120 is operatively associated with the mold 116 and positioned so that a partially cured fiber-reinforced plastic article 112 is cured in a non-linear shape (i.e., spirally wound) as it is taken up on the mold 116. The energy source 120 is also operatively associated with the second die portion 122 such that the partially cured fiber-reinforced plastic article 112 is cured to have a lateral cross-section that has substantially the shape of the second die. The second die portion 122 is preferably substantially transparent (i.e., transmits at least 90% of emitted energy) to the energy emitted by the energy source 120. More preferably, the second die portion transmits at least 95% of the emitted energy, and, most preferably, the second die portion transmits at least 99% of the emitted energy. For example, when the energy source 120 is an electromagnetic radiation source that emits electromagnetic radiation in the visible spectrum, the second die portion 122 preferably comprises quartz. A particularly preferred second die portion 122 may be fabricated from a standard plate of quartz as will be understood by those skilled in the art. Those skilled in the art will be able to select appropriate materials for the second die portion 122 based on the type of energy emitted by the energy source 120.

To achieve uniform material characteristics for the fiber-reinforced plastic article, it is preferable that a ratio of the energy input into the fiber-reinforced plastic article per unit length of the fiber-reinforced plastic article be substantially constant. This ratio may be maintained substantially constant in various ways, such as, but not limited to: (1) maintaining constant energy input from the energy source 120 while varying the speed of the drive wheel 106 to account for the non-circular outer circumference of the mold 116 having an elliptical lateral cross-section; or (2) maintaining constant the speed of the drive wheel 106 while varying or pulsing the energy input from the energy source 120. The rotation of the mold and the pulsing of the energy input from the energy source may be controlled by a computer that is programmed to maintain a substantially constant ratio of the energy input per unit length of the fiber-reinforced plastic article. In an alternative embodiment, the ratio of energy input into the fiber-reinforced plastic article per unit length of the fiber-reinforced plastic article may be varied so that the fiber-reinforced plastic article does not have uniform properties along its length. For example, the archwire may be more fully cured in the posterior region than in the anterior region. Such an archwire may have its inherent stiffness in the posterior region immediately but more formability in its anterior region so that the archwire could be modified before the practitioner initiates final curing to provide substantially uniform stiffness to the modified archwire. The partially-cured archwires are preferably stored in a dark, refrigerated, oxygen-free environment. Modification of the archwire may be desirable if the arch of the mold does not precisely match the arch of the teeth undergoing correction, and/or if loops, bends, and/or step-bends are necessary. Modification and final curing preferably occurs in the practitioner's office. The practitioner may employ various devices including, but not limited to, a triad device to effect the final cure.

Figure 2:
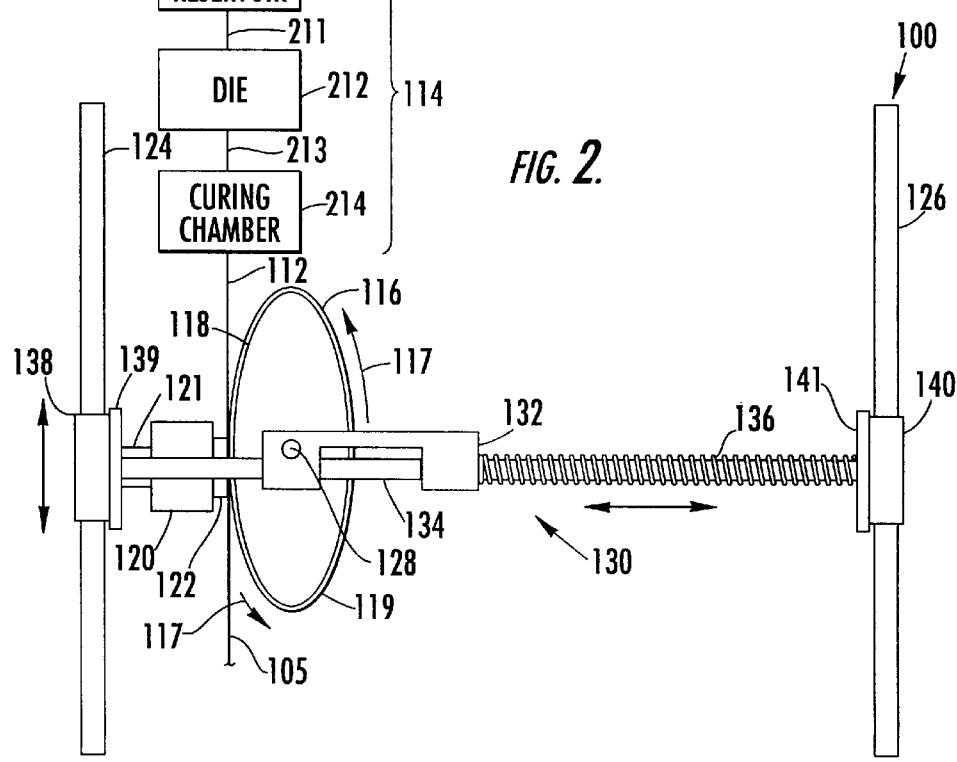
FIG. 2 is an end view of the embodiment of the pultrusion apparatus of FIG. 1 with an exploded schematic diagram of the alpha-staging portion of the apparatus.

Turning to FIG. 2, the alpha-staging apparatus 114 shown in the embodiment of FIG. 1 will now be further described. The alpha-staging apparatus 114 includes a polymer reservoir 210 operatively associated with a forming die 212 and a curing chamber 214. In general, a plurality of continuous fibers 110 enter the polymer reservoir 210 and are coated with a polymer resin. The coated fibers 211 are then formed by the forming die 212 which results in coated fibers having an initial cross-sectional shape 213. The coated fibers having a desired cross-section 213 are then cured in the curing chamber 214 to form the partially cured fiber-reinforced plastic article 112, which is flexible enough for further forming. A particularly preferred alpha-staging apparatus is disclosed in U.S. Pat. No. 5,869,178 to Kusy et al., the disclosure of which is incorporated herein by reference in its entirety. The mold 116 may move longitudinally or laterally within the carriage system so that the die defined by the first and the second die portion 122 and the forming die 212 are substantially vertically aligned with one another as the partially cured fiber-reinforced plastic article 112 is taken up along a longitudinal portion of the mold 116. Although the embodiment of the carriage system shown in FIGS. 1 and 2 provides for longitudinal and lateral motion of the mold 116, it is to be understood that carriage systems of the present invention may also provide for vertical movement of the mold.

Still referring to FIG. 2, an energy source associated with the curing chamber 214 and the energy source 120 may emit the same or different types of energy. If the two energy sources emit the same type of energy (e.g., electromagnetic energy in the ultraviolet spectrum), it may be difficult to control the amount of cure that the fiber-reinforced plastic article undergoes during alpha-staging. As a result, it is preferable that the two energy sources emit different types of energy. More preferably, the energy source associated with the curing chamber 214 emits electromagnetic radiation in the ultraviolet spectrum while the energy source 120 emits electromagnetic radiation in the visible spectrum, or vice versa.

While the fiber-reinforced plastic article is preferably fully cured by apparatus according to the present invention, it may be desirable for these apparatus to form partially cured fiber-reinforced plastic articles. Such partially cured articles may be useful, for example, by dentists who prefer to perform a final forming step in their offices in order to conform the plastic article (e.g., an archwire) to fit the needs of a particular patient. Apparatus according to the present invention may provide such partially cured fiber-reinforced articles in various ways. For example, the curing chamber 214 in the alpha-staging apparatus 114 may be turned off such that the resin-coated fibers are not cured in the alpha-staging apparatus. In an alternative embodiment, an alpha-staging apparatus of the present invention may be provided without a curing chamber such that the fibers are coated with a polymer resin but not cured in the alpha-staging apparatus. The resin-coated fibers may then be partially cured by the energy source 120 as they are taken up on the mold 116. These partially cured articles may then be provided to a third party (e.g., a dentist) for final shaping and curing. In yet another alternative embodiment, the curing chamber 214 and the energy source 120 may use the same type of energy (e.g., visible energy) to partially cure the fiber-reinforced article. The partially cured fiber-reinforced article could then be completely cured by a separate apparatus located, for example, at a dentist office using an energy source that emits a different type of energy (e.g., an ultraviolet energy source). In still another embodiment, a polymer resin having a ternary cure system could be used such that the fiber-reinforced plastic article is partially cured in the curing chamber 214 which emits a first type of energy, is further cured as it is taken up on the mold 116 by the energy source 120 which emits a second type of energy, and is cured to completion by a separate apparatus which emits a third type of energy. The separate apparatus is preferably a triad device in a dental practitioner's office.

The polymer reservoir 210 preferably contains a polymer composition according to embodiments of the present invention. The polymer composition is preferably biocompatible when used to form a medical device, such as a dental archwire. Polymer compositions of the present invention have been formulated to allow for partial curing by input of electromagnetic radiation in either the ultraviolet or visible spectra followed by more fully curing by input of the type of electromagnetic radiation (ultraviolet or visible) not used for the partial cure. According to embodiments of the present invention, the polymer composition comprises a binder monomer, a diluent monomer, an ultraviolet photoinitiator, a visible photoinitiator, and an accelerator. The use of a dual cure polymer system may allow for more control over the flexibility of the initial composite.

The polymer composition comprises preferably from about 55 to about 85 percent by weight, more preferably from about 60 to about 80 percent by weight, and most preferably from about 70 to about 80 percent by weight, of the binder monomer. The binder monomer is preferably selected from the group consisting of 2,2-bis[4-(2-hydroxy-3-methacryloxypropoxy)phenyl]propane (Bis-GMA), 2,2-bis(4-methacryloyloxy-phenyl)propane, 2,2-bis-[4-(2-hydroxyethoxy) phenyl]propane dimethacrylate, 2,2-bis-(4-hydroxyphenyl)propane dimethacrylate, 2,2-bis-[4-(2-hydroxypropoxy)phenyl]propane dimethacrylate, and mixtures thereof. More preferably, the binder monomer is Bis-GMA. Mixtures of urethane diacrylate oligomers in combination with Bis-GMA as described in Robert G. Craig, "Chemistry, Composition, and Properties of Composite Resins," Symposium on Composite Resins in Dentistry, *Dental Clinics of North America,* 25(2): 219–239 (April 1981).

The polymer composition comprises preferably from about 15 to about 45 percent by weight, more preferably from about 20 to about 40 percent by weight, and most preferably from about 20 to about 30 percent by weight, of a diluent monomer. The diluent monomer is preferably an acrylic monomer. The acrylic monomer is preferably selected from the group consisting of methyl methacrylate (MMA), isobutyl methacrylate, cyclohexyl methacrylate, triethylene glycol methacrylate (TEGMA), ethylene glycol dimethacrylate, diethylene glycol dimethacrylate, triethylene glycol dimethacrylate (TEGDMA), tetraethylene glycol dimethacrylate, trimethylolpropane trimethacrylate, 1,6 hexanediol dimethacrylate, 1,4-butanediol dimethacrylate, and mixtures thereof. When the acrylic monomer is a monomethacrylate monomer, it is preferably methyl methacrylate. When the acrylic monomer is a di- or trimethacrylate monomer, it is preferably triethylene glycol dimethacrylate.

The polymer composition comprises preferably from about 0.05 to about 1 percent by weight, more preferably from about 0.2 to about 0.7 percent by weight, and most preferably from about 0.3 to about 0.5 percent by weight, of an ultraviolet photoinitiator. The ultraviolet photoinitiator is preferably an ether, and is more preferably a benzyl alkyl ether. The ether is preferably selected from the group consisting of benzoin methyl ether, benzoin ethyl ether, benzoin butyl ether, benzoin isobutyl ether, benzoin phenyl ether, and mixtures thereof. The ether is most preferably benzoin ethyl ether.

The polymer composition comprises preferably from about 0.05 to about 0.5 percent by weight, more preferably from about 0.05 to about 0.3 percent by weight, and most preferably from about 0.05 to about 0.15 percent by weight, of an a visible photoinitiator. The visible photoinitiator is preferably a quinone. The quinone is preferably selected from the group consisting of camphorquinone, 9,10-phenanthraquinone, 9,10-anthraquinone, acenaphtheneinone, α-naphthoquinone, β-naphthoquinone, 2-methyl-1,4-naphthoquinone, 2-t-butyl-9,10-anthraquinone, 2-ethylanthraquinone, 1-chloroanthraquinone, 1,2-benzanthraquinone, 2-methylanthraquinone, 2-methyl-3-phytyl-1,4-naphthoquinone, 2-methyl-3-geranylgeranyl-1,4-naphthoquinone, 2,3-dimethoxy-5-methyl-1,4-benzoquinone, and mixtures thereof. The quinone is most preferably camphorquinone.

The polymer resin comprises preferably from about 0.05 to about 0.5 percent by weight, more preferably from about 0.05 to about 0.3 percent by weight, and most preferably from about 0.05 to about 0.15 percent by weight, of an accelerator. The accelerator is preferably selected from the group consisting of dimethyl aminoethyl methacrylate, N,N-dimethyl-p-toluidine, N,N-dihydroxyethyl-p-toluidine, N-(2-cyanoethyl)-N-methylaniline, and mixtures thereof. The accelerator is more preferably selected from the group consisting of N,N-dimethyl-p-toluidine, N,N-dihydroxyethyl-p-toluidine, dimethyl aminoethyl methacrylate, and mixtures thereof.

Figure 3:
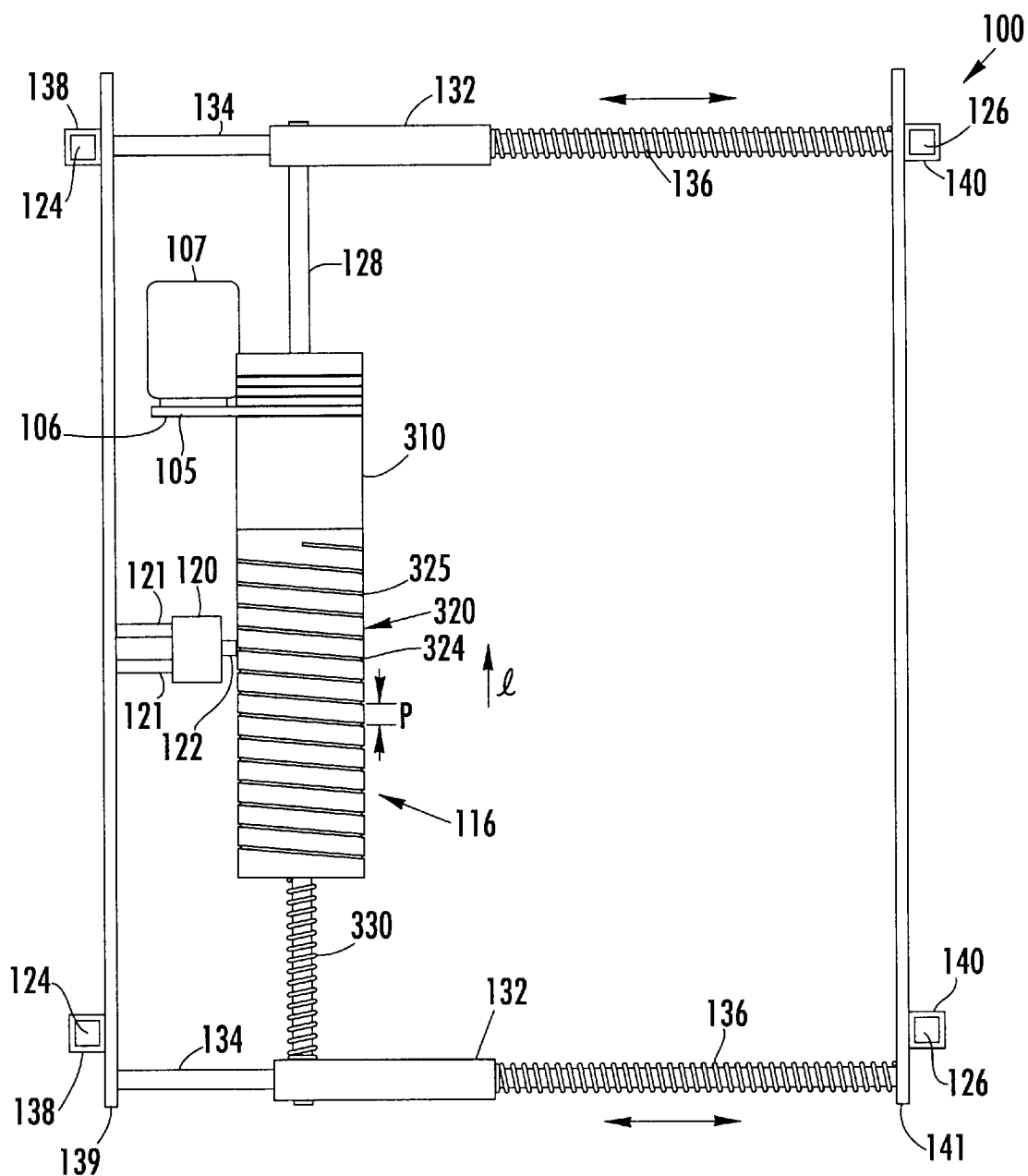
FIG. 3 is a top view of the embodiment of the pultrusion apparatus of FIG. 1.

Referring now to FIG. 3, a top view of the embodiment of the pultrusion apparatus 100 described above with reference to FIG. 1 will now be described. The alpha staging apparatus 114 has been omitted for clarity. A spring 330 provides for movement of the mold 116 in the longitudinal direction 1 along longitudinal slide rod 128. The longitudinally extending mold 116 has a core 310 having a longitudinally extending outer surface. The core preferably comprises a material selected from the group consisting of wood, plastic, metal, ceramic, and/or composite, and in the presented embodiments is comprised of a wood inner core and a body filler (Dynatron/Bondo Co., Atlanta, Ga.) outer core. A longitudinally extending sleeve 320 substantially surrounds a portion of the outer surface of the core 310. The longitudinally extending sleeve 320 preferentially substantially surrounds the longitudinal outer surfaces of the core 310. The sleeve preferably comprises a material that provides a non-adherent surface; more preferably the sleeve comprises a fluoropolymer. A particularly preferred sleeve material is one of the partially or fully fluorinated materials marketed as Teflon® or Teflon® PFA (DuPont Corp., Wilmington, Del.). As illustrated in FIG. 3, the sleeve 320 does not extend the entire length of the mold 116. However, it is to be understood that sleeves of the present invention may extend the entire length of the mold. While the core 310 and the sleeve 320 as shown in FIG. 3 are separately formed, it is to be understood that cores and sleeves of the present invention may be integrally formed, preferably from the group consisting of wood, plastic, metal, ceramic, and/or composite.

Figure 7:
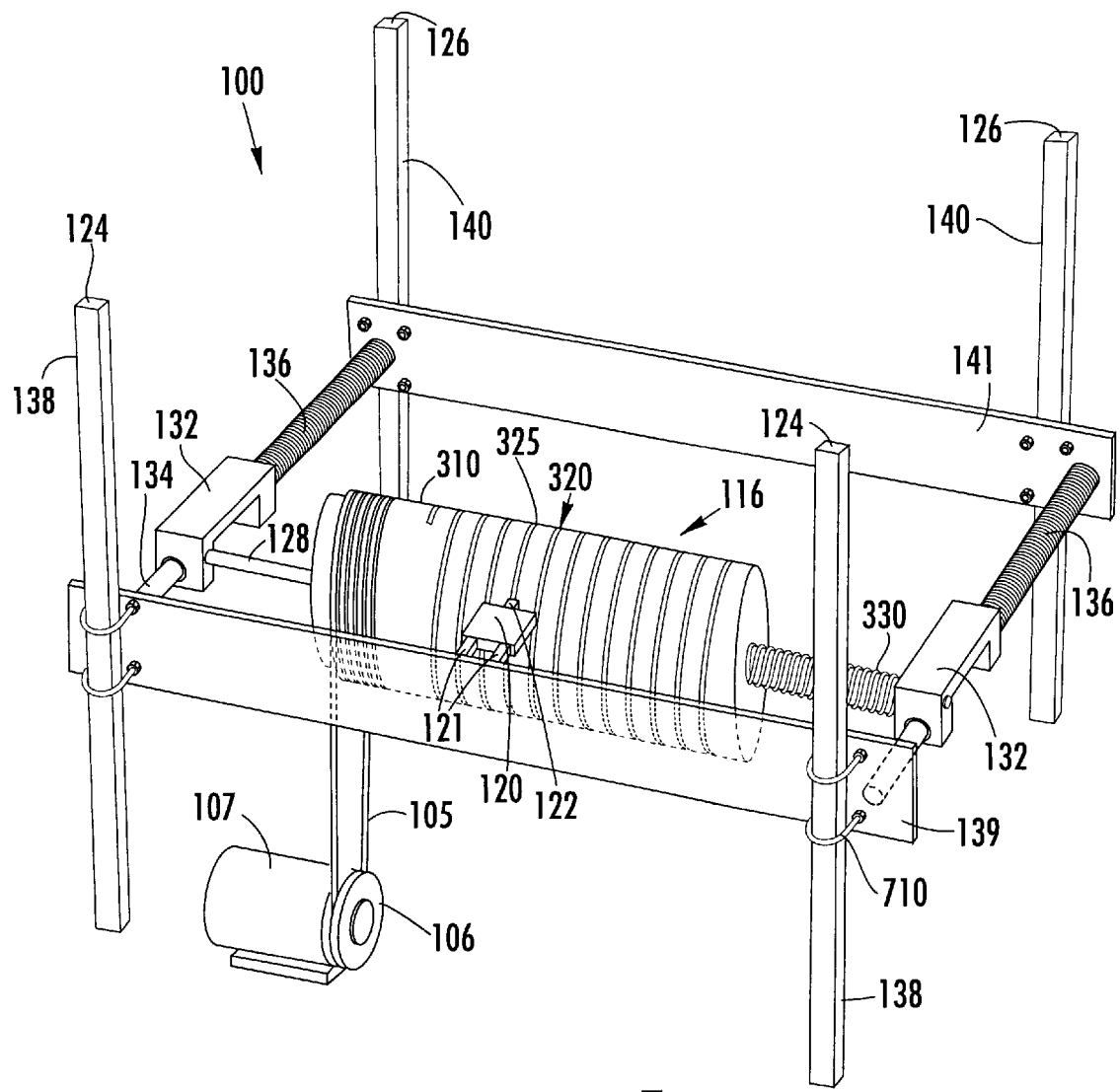
FIG. 7 is a perspective view of the apparatus illustrated in FIG. 3.

Still referring to FIG. 3, the sleeve 320 is preferably configured to provide a first die portion 324. The first die portion 324 defines a spirally wound groove in and/or a protuberance on the surface of the sleeve 320. In the embodiment illustrated in FIG. 3, the fiber-reinforced plastic article is formed in the first die portion 324 as shown at 325. The configuration of the first die portion 324 is more fully described hereinafter with reference to FIG. 4. As illustrated in FIG. 3, the spirally wound groove has a pitch p that is preferably between about 0.00025 and about 0.33 meters, more preferably between about 0.025 and about 3.0 centimeters, and most preferably between about 0.25 and about 1.25 millimeters. When the pultrusion apparatus according to embodiments of the present invention is used to fabricate an orthodontic appliance, such as a preformed archwire, as described above with reference to FIG. 1, the pitch p of the spirally wound groove may be critical for several reasons. First, the pitch p may cause the arch to have a slight cant such that it does not lie perfectly flat on a flat surface. This cant may cause undesired teeth movement when the preformed archwire is installed. Second, the pitch may actually cause the cross-section of the arch wire to have a slight twist that may cause undesired teeth movement. As a result, the spirally wound groove at the surface of the mold in a pultrusion apparatus for forming orthodontic archwires according to the present invention preferably has a pitch between about 0.25 and about 1.25 millimeters. A perspective view of the apparatus illustrated in FIGS. 1–3 is provided in FIG. 7. As in FIG. 3, the alpha staging apparatus 114 has been omitted for clarity. The plurality of continuous fibers 110 and the partially cured fiber-reinforced plastic article 112 have also been omitted for clarity. In this embodiment, the support column members 124 are coupled to a first cross bar member 139 by U-shaped bolts 710.

Figure 4A:
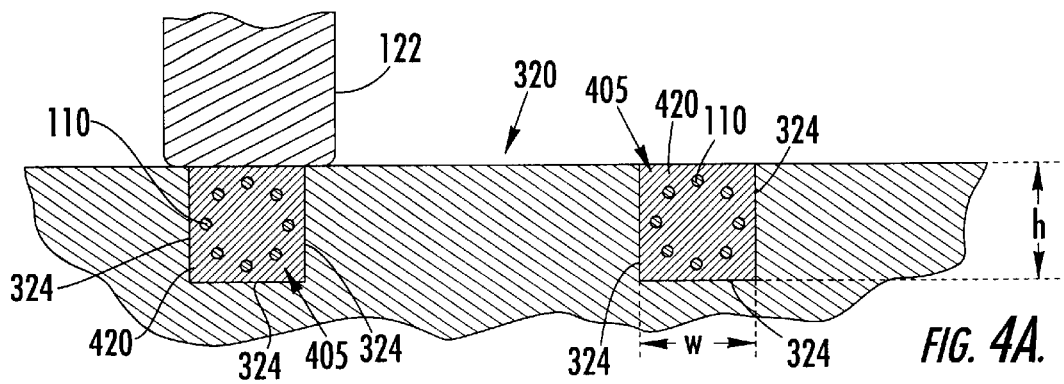
FIG. 4A is an exploded view of the apparatus illustrated in FIG. 3 showing the die portion abutting a sleeve to shape a pultruded fiber positioned in the surface of the sleeve.

Referring now to FIGS. 4A through 4D, the configuration of the first die portion 324 and the second die portion 122 to define the die will now be described. As illustrated in FIG. 4A, the second die portion 122 is positioned to abut the sleeve 320 such that the first die portion 324 and the second die portion 122 define a die configured to receive and shape, and, in this embodiment, more fully cure the partially cured fiber-reinforced plastic article to form a fiber-reinforced plastic article 405. As shown in FIG. 4A, the fiber-reinforced plastic article 405 has continuous fibers 110 in a polymer matrix 420 formed from the polymer resin as described above with referenced to FIG. 2. The die has a height h that is preferably between about 0.00025 and about 0.33 meters, more preferably between about 0.025 and about 2.5 centimeters, and most preferably between about 0.25 and about 1.5 millimeters. The width w of the die is preferably between about 0.00025 and about 0.33 meters, more preferably between about 0.025 and about 2.5 centimeters, and most preferably between about 0.25 and about 1.5 millimeters. When the pultrusion apparatus is used to fabricate an orthodontic appliance such as a preformed archwire, the dimensions of the die may be critical as they determine the cross-sectional dimensions of the resulting archwire, which help to ensure that the archwire properly engages the brackets and/or molar tubes and that the archwire appropriately delivers the forces per unit of deactivation to the teeth. While the embodiment illustrated in FIG. 4A shows a die defined by the first die portion 324 and the second die portion 122 with the fiber-reinforced plastic article 405 positioned in the sleeve 320, it is to be understood that the fiber-reinforced plastic article 405 may also be positioned in the first die portion 122, or positioned partially in the first die portion 122 and partially in the sleeve 320.

Figure 4B:
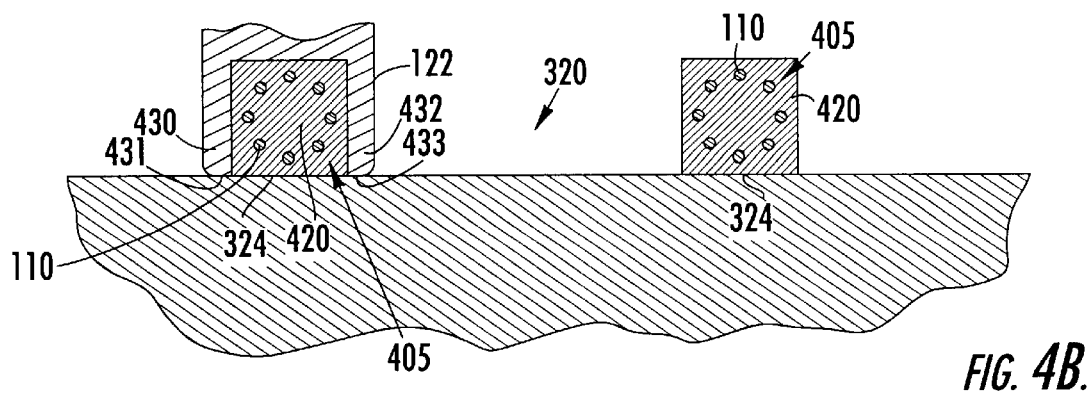
FIG. 4B is an exploded view of the apparatus illustrated in FIG. 3 showing the die portion abutting a sleeve to shape a pultruded fiber positioned in the die portion.

As illustrated in FIG. 4B, the fiber-reinforced plastic article 405 is positioned in the first die portion 122. The first die portion 122 has a first arm 430 and a second arm 432 that define two sides of the die defined by the first die portion 122 and the second die portion 324. While the end 431 of the first arm 430 and the end 433 of the second arm 432 are shown to abut the surface of the sleeve 320 as illustrated in FIG. 4B, it is to be understood that one or both of the first and the second arms 430 and 432, respectively, may extend into the sleeve. In this way, the first and/or the second arm 430 and 432, respectively, may act as a guide to align the first die portion 122 with the second die portion 324.

Figure 4C:
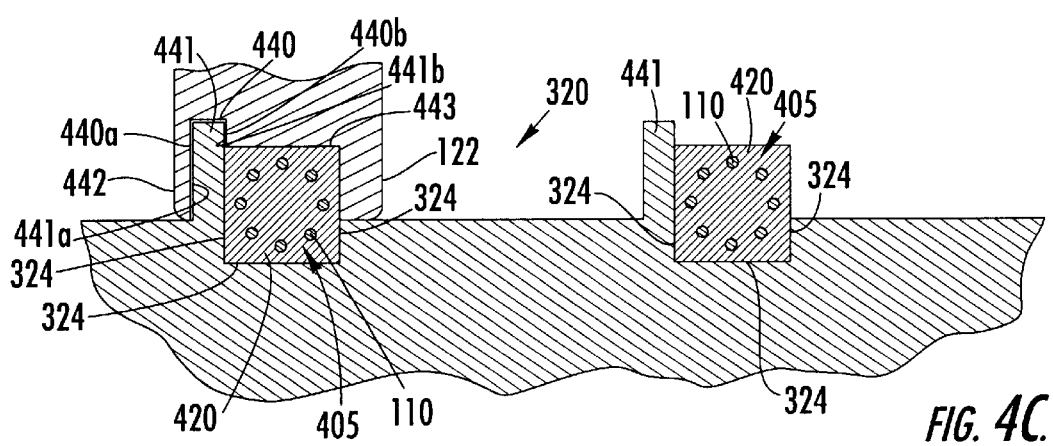
FIG. 4C is an exploded view of the apparatus illustrated in FIG. 3 showing the die portion abutting a sleeve to shape a pultruded fiber positioned partially in the surface of the sleeve and partially in the die portion.
Figure 4D:
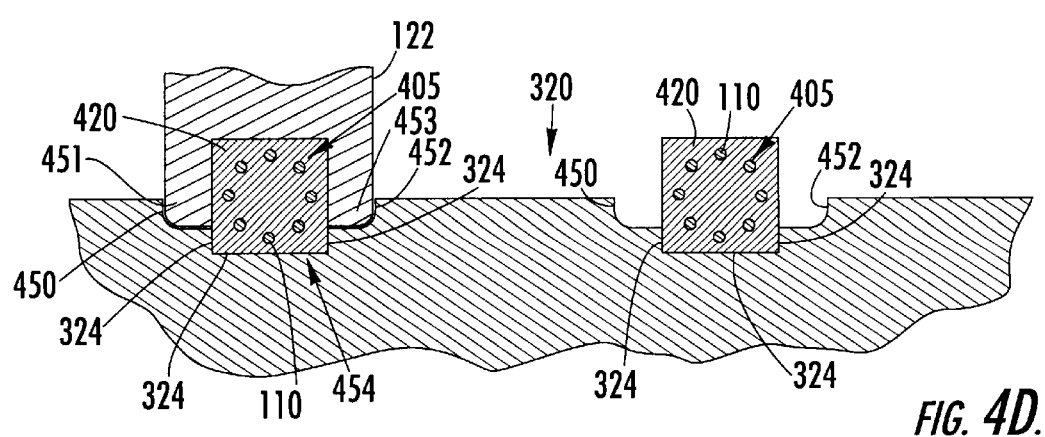
FIG. 4D is an exploded view of the apparatus illustrated in FIG. 3 showing the die portion abutting a sleeve to shape a pultruded fiber positioned partially in the surface of the sleeve and partially in the die portion.

As illustrated in FIGS. 4C and 4D, the fiber-reinforced plastic article 405 is positioned partially in the first die portion 122 and partially in the sleeve 320. Referring first to FIG. 4C, the first die portion 122 has a groove 440 defined in part by an arm 442. The sleeve 320 has a protuberance 441 that extends from the surface of the sleeve 320 and engages the groove 440 of the first die portion 122. While the protuberance 441 and the groove 440 shown in the embodiment of FIG. 4C extend beyond the upper surface 443 of the fiber-reinforced plastic article 405, it is to be understood that protuberances and grooves according to the present invention may extend to a position that is shallower than the upper surface of the fiber-reinforced article, provided, however, that the groove 440 and the protuberance 441 are biased in such a way as to ensure that the groove side 440a contacts the protuberance side 441a. While the embodiment illustrated in FIG. 4C show a first die portion 122 having an arm 442, it is to be understood that first die portions of the present invention need not have an arm, provided, however, that the groove 440 and the protuberance 441 are biased in such a way as to ensure that the groove side 440b contacts the protuberance side 441b. Although the embodiment illustrated in FIG. 4C show only one groove 440 and one protuberance 441 on only one side of the fiber-reinforced plastic article 405, it is to be understood that first die portions and sleeves of the present invention may have one or more grooves and protuberances, which may be located on one or both sides of the fiber-reinforced plastic article.

Referring now to FIG. 4D, the sleeve 320 has a first groove 450 and a second groove 452. The first die portion has a first arm 451 and a second arm 453 that engages the first and the second grooves 450 and 452, respectively. While the embodiment illustrated in FIG. 4D shows first and second arms 451 and 453, respectively, and first and second grooves 450 and 452, respectively, that are shallower than the lower surface 454 of the fiber-reinforced plastic article 405, it is to be understood that one or both of the arms and grooves of the present invention may extend beyond the lower surface of the fiber-reinforced plastic article. Although the embodiment illustrated in FIG. 4D shows a first die portion 122 having a first arm 451 positioned on a first side of the fiber-reinforced plastic article 405, and a second arm 453 positioned on a second side of the fiber-reinforced plastic article 405 opposite the first side, it is to be understood that first die portions of the present invention may have only one arm positioned on only one side of the fiber-reinforced plastic article, provided, of course, that the outer side of the arm and the inner side of the groove are biased so as to contact one another if the arm and the groove do not extend beyond the lower surface of the fiber-reinforced plastic article. It is also to be understood that first die portions and sleeves of the present invention may have more than one arm and more than one groove, respectively, on one or both sides of the fiber-reinforced plastic article. While various embodiments of dies defined by configurations of first die portions and sleeves have been illustrated in FIGS. 4A through 4D and described with reference thereto, the present invention should not be limited to the illustrated embodiments, which have been provided so that this disclosure will be thorough and complete and will fully convey the scope of the invention to those skilled in the art. Those skilled in the art will understand that other suitable configurations within the scope of the invention may be possible.

The continuous fibers 110 may be selected from various fibers as will be understood by those skilled in the art including, but not limited to, polymeric fibers including polyethylene fibers (e.g., ultra high molecular weight polyethylene fibers such as Spectra series, and/or self-reinforcing liquid crystal or nanocrystalline polymeric fibers), Kevlar® brand fibers, nylon fibers, glass fibers (S2 and E), carbon fibers such as graphite, quartz fibers, metal fibers, ceramic fibers, boron fibers, aluminum fibers, or combinations thereof. Such fibers are commercially available from various companies as will be understood by those skilled in the art. Fibers are preferably pre-coated with a coupling agent such as a silane, as will be understood by those skilled in the art.

Fiber-reinforced plastic articles according to the present invention may have various levels of fiber loading. The fiber loading is preferably expressed as the volume fraction of reinforcement, $V_f$, which may be calculated by summing the cross-sectional area of the fibers in the cross-section of a fiber-reinforced plastic article and dividing by the total area of the cross-section of the fiber-reinforced plastic article. As will be understood by those skilled in the art, $V_f$ can vary from about 0.2 to about 0.85. $V_f$ is preferably from about 0.4 to about 0.8, is more preferably from about 0.5 to about 0.75, and is most preferably from about 0.6 to about 0.7.

Referring now to FIG. 5, an embodiment of a pultrusion apparatus 500 according to the present invention having a second die portion 512 and an energy source 514 that are not operatively associated will now be described. While similar to the pultrusion apparatus 100 described above with reference to FIG. 1, the pultrusion apparatus 500 has an energy source 514 that is not operatively associated with the second die portion 512, which is coupled to the cross member 139 by coupling member 510. Instead, the partially cured fiber-reinforced plastic article 112 is laterally shaped by the die defined by the second die portion 512 and the mold 116 prior to being cured by the energy source 514. The second die portion 512 and the energy source 514 are similar to the second die portion 122 and the energy source 120, respectively, described above with reference to FIG. 1 and will not be further described.

Referring now to FIG. 6, an embodiment of a pultrusion apparatus 600 according to the present invention having an energy source 514 and no second die portion. The pultrusion apparatus 600 longitudinally shapes the partially cured fiber-reinforced plastic article as it is continuously taken up on the mold 116. However, unlike the embodiments illustrated in FIGS. 1 through 5, the pultrusion apparatus 600 does not shape the cross-section of the partially cured fiber-reinforced plastic article.

While embodiments of the present invention have focused on the fabrication of preformed archwires, it is to be understood that apparatus according to the present invention may be used to fabricate orthodontic appliances such as passive appliances (e.g., retainers and space maintainers) and/or functional appliances (e.g., face bows, palatal expansion apparatus, and cleft palate devices) as well as articles for general dentistry and/or medical applications such as, for example, alveolar ridge augmentation, bone scaffolding, bridge abutments, facial reconstruction, and/or splints. Apparatus according to the present invention can also be used in various situations where contouring of a preform or prepreg is advantageous, in various situations where anisotropy (i.e., different properties in different directions) is beneficial, and/or various situations where high strength, variable stiffness, high springback, and/or high resilience is needed after formability is complete. For example, apparatus of the present invention may be used to form struts, curved beams, springs, and/or cables for diverse applications such as construction, sports, and/or aerospace, among others.

The foregoing embodiments are illustrative of the present invention and are not to be construed as limiting thereof. The invention is defined by the following claims, with equivalents of the claims to be included therein.

That which is claimed is:

1. A pultrusion apparatus for manufacturing a fiber-reinforced polymeric article having a non-linear shape, the pultrusion apparatus comprising:

an alpha-staging apparatus comprising a curing chamber having an alpha-staging energy source for partially curing fiber-reinforced polymeric article;

a mold configured to receive the partially cured fiber-reinforced polymeric article and form the partially cured fiber-reinforced polymeric article into a spirally wound shape;

a drive mechanism coupled to said mold configured to rotate said mold such that the fiber-reinforced polymeric article is taken up on said mold; and an energy source operatively associated with said mold and positioned so that the partially cured fiber-reinforced polymeric article is cured in the spirally wound shape as it is taken up on said mold;

wherein said energy source operatively associated with said mold and said alpha-staging energy source emit electromagnetic radiation.

2. The apparatus according to claim 1, wherein said mold comprises:

a core having a longitudinally extending outer surface; and a longitudinally extending sleeve substantially surrounding a portion of the outer surface of said core and configured to provide a first die portion.

3. The apparatus according to claim 2, wherein said sleeve comprises a material that provides a non-adherent surface.

4. The apparatus according to claim 2, further comprising:

a second die portion positioned to abut said sleeve such that said first die portion and said second die portion define a die configured to receive the partially cured fiber-reinforced polymeric article.

5. The apparatus according to claim 1, wherein said mold has a substantially elliptical cross-section.

6. The apparatus according to claim 1, further comprising an alpha-staging apparatus through which one or more fibers are drawn to form the partially cured fiber-reinforced polymeric article.

7. The apparatus according to claim 6, wherein said alpha-staging apparatus includes:

a polymer reservoir through which one or more fibers are drawn to form an uncured fiber-reinforced polymeric article; and a curing chamber configured to receive the uncured fiber-reinforced polymeric article and form the partially cured fiber-reinforced polymeric article.

8. The apparatus according to claim 7, wherein said alpha-staging apparatus further includes:

a forming die having a cross-section and configured to receive the uncured fiber-reinforced article from said polymer reservoir and form the uncured fiber-reinforced polymeric article to have a cross-section that is retained by the uncured fiber-reinforced polymeric article as it is received by said curing chamber.

9. The apparatus according to claim 8, wherein said curing chamber is vertically disposed from said forming die so that the one or more fibers in the partially cured fiber-reinforced polymeric article are substantially vertically oriented.

10. The apparatus according to claim 9, further comprising a carriage system operatively associated with said mold for maintaining said curing chamber and said forming die in substantially vertical alignment with one another.

11. The apparatus according to claim 10, wherein said mold moves longitudinally within said carriage system such that said caring chamber and said forming die are substantially vertically aligned with one another as the fiber-reinforced polymeric article is taken up along a longitudinal portion of said mold.

12. A The apparatus according to claim 13, wherein said energy source operatively associated with said mold emits electromagnetic radiation in the visible spectrum and said alpha-staging energy source emits electromagnetic radiation in the ultraviolet spectrum.

13. A pultrusion apparatus for manufacturing a fiber-reinforced polymeric article having a non-linear shape, the pultrusion apparatus comprising:
   a mold configured to receive a partially cured fiber-reinforced polymeric article and form the partially cured fiber-reinforced polymeric article into a spirally wound shape, said mold further comprising:
      a core having a longitudinally extending outer surface; and
      a longitudinally extending sleeve substantially surrounding a portion of the outer surface of said core and configured to provide a first die portion, wherein said sleeve comprises a material that provides a non-adherent surface;
   a drive mechanism coupled to said mold configured to rotate said mold such that the fiber-reinforced polymeric article is taken up on said mold; and
   an energy source operatively associated with said mold and positional so that the partially cured fiber-reinforced polymeric article is cured in the spirally wound shape as it is taken up on said mold.

14. The apparatus according to claim 13, wherein said material comprises a fluoropolymer.

15. The apparatus according to claim 13, wherein said sleeve and said core are integrally formed.

16. The apparatus according to claim 13, wherein said mold has a substantially elliptical cross-section.

17. The apparatus according to claim 13, further comprising an alpha-staging apparatus through which one or more fibers are drawn to form the partially cured fiber-reinforced polymeric article.

18. The apparatus according to claim 17, wherein said alpha-staging apparatus includes:
   a polymer reservoir through which one or more fibers are drawn to form an uncured fiber-reinforced polymeric article; and
   a curing chamber configured to receive the uncured fiber-reinforced polymeric article and form the partially cured fiber-reinforced polymeric article.

19. The apparatus according to claim 18, wherein said alpha-staging apparatus further includes:
   a forming die having a cross-section and configured to receive the uncured fiber-reinforced article from said polymer reservoir and form the uncured fiber-reinforced polymeric article to have a cross-section that is retained by the uncured fiber-reinforced polymeric article as it is received by said curing chamber.

20. The apparatus according to claim 19, wherein said curing chamber is vertically disposed from said forming die so that the one or more fibers in the partially cured fiber-reinforced polymeric article are substantially vertically oriented.

21. The apparatus according to claim 20, further comprising a carriage system operatively associated with said mold for maintaining said curing chamber and said forming die in substantially vertical alignment with one another.

22. The apparatus according to claim 21, wherein said mold moves longitudinally within said carriage system such that said curing chamber and said forming die are substantially vertically aligned with one another as the fiber-reinforced polymeric article is taken up along a longitudinal portion of said mold.

23. A pultrusion apparatus for manufacturing a fiber-reinforced polymeric article having a non-linear shape, the pultrusion apparatus comprising:
   a mold configured to receive a partially cured fiber-reinforced polymeric article and form the partially cured fiber-reinforced polymeric article into a spirally wound shape, said mold comprising:
      a core having a longitudinally extending outer surface; and
      a longitudinally extending sleeve substantially surrounding a portion of the outer surface of said core and configured to provide a first die portion;
   a drive mechanism coupled to said mold configured to rotate said mold such that the fiber-reinforced polymeric article is taken up on said mold;
   an energy source operatively associated with said mold and positioned so that the partially cured fiber-reinforced polymeric article is cured in the spirally wound shape as it is taken up on said mold; and
   a second die portion positioned to abut said sleeve such that said first die portion and said second die portion define a die configured to receive the partially cured fiber-reinforce polymeric article.

24. The apparatus according to claim 23, wherein said die has a substantially rectangular cross-section.

25. The apparatus according to claim 23, wherein said energy source is positioned downstream from said die.

26. The apparatus according to claim 23, wherein said energy source is operatively associated with said second die portion.

27. The apparatus according to claim 26, wherein said energy source is an electromagnetic radiation source, and wherein said second die portion comprises a material that is substantially transparent to electromagnetic radiation emitted by said electromagnetic radiation source.

28. The apparatus according to claim 27, wherein said electromagnetic radiation source emits electromagnetic radiation in the ultraviolet spectrum.

29. The apparatus according to claim 27, wherein said electromagnetic radiation source emits electromagnetic radiation in the visible spectrum.

30. The apparatus according to claim 27, wherein said second die portion comprises a quartz material.

31. The apparatus according to claim 23, wherein said mold has a substantially elliptical cross-section.

32. The apparatus according to claim 23, further staging apparatus through which one or more fibers are drawn to form the partially cured fiber-reinforced polymeric article.

33. The apparatus according to claim 32, wherein said alpha-staging apparatus includes:
   a polymer reservoir trough which one or more fibers are drawn to form an uncured fiber-reinforced polymeric article; and
   a curing chamber configured to receive the uncured fiber-reinforced polymeric article and form the partially cured fiber-reinforced polymeric article.

34. The apparatus according to claim 33, wherein said alpha-staging apparatus further includes:
   a forming die having a cross-section and configured to receive the uncured fiber-reinforced article from said polymer reservoir and form the uncured fiber-reinforced polymeric article to have a cross-section that is retained by the uncured fiber-reinforced polymeric article as it is received by said curing chamber.

35. The apparatus according to claim 34, wherein said curing chamber is vertically disposed from said forming die so that the one or more fibers in the partially cured fiber-reinforced polymeric article are substantially vertically oriented.

36. The apparatus according to claim 35, further comprising a carriage system operatively associated with said mold for maintaining said curing chamber and said forming die in substantially vertical alignment with one another.

37. The apparatus according to claim 36, wherein said mold moves longitudinally within said carriage system such that said curing chamber and said forming die are substantially vertically aligned with one another as the fiber-reinforced polymeric article is taken up along a longitudinal portion of said mold.

* * * * *